United States Patent [19]

Maeda

[11] Patent Number: 5,038,299
[45] Date of Patent: Aug. 6, 1991

[54] SERIAL/PARALLEL TRANSFER APPARATUS

[75] Inventor: Yuji Maeda, Shizuoka, Japan

[73] Assignee: Tokyo Electric Co., Ltd., Tokyo, Japan

[21] Appl. No.: 414,601

[22] Filed: Sep. 29, 1989

Related U.S. Application Data

[63] Continuation of Ser. No. 113,862, Oct. 29, 1987, abandoned.

[30] Foreign Application Priority Data

Oct. 30, 1986 [JP] Japan .................. 61-259046

[51] Int. Cl.$^5$ .................................. G06F 3/00
[52] U.S. Cl. .................. 364/519; 346/33 R; 364/200
[58] Field of Search ................ 364/518–521, 364/200 MS File; 340/721, 723; 341/2, 12, 159, 160; 346/33 R, 154, 160

[56] References Cited

U.S. PATENT DOCUMENTS

| | | |
|---|---|---|
| 4,079,452 | 3/1978 | Larson .................. 364/200 |
| 4,174,536 | 11/1979 | Misunas et al. .................. 364/200 |
| 4,437,157 | 3/1984 | Witalka et al. .................. 364/200 |
| 4,638,422 | 1/1987 | Rees .................. 364/200 |

FOREIGN PATENT DOCUMENTS 0139756  9/1984  European Pat. Off. .
59-204888 11/1984 Japan .

Primary Examiner—Gary V. Harkcom
Assistant Examiner—H. R. Herndon
Attorney, Agent, or Firm—Oblon, Spivak, McClelland, Maier & Neustadt

[57] ABSTRACT

An electronic apparatus includes a program memory having a parallel transfer program and a serial transfer program, a connector on the electronic apparatus to which a parallel transfer interface or a serial transfer interface is detachably connected, and a judging unit for judging the kind of the printer interface connected to the connector. A program suitable for the kind of the printer interface judged by the judge unit is called from the program memory by means of a program selecting unit. This enables the electronic apparatus to be connected for use with a parallel transfer printer and a serial transfer printer.

6 Claims, 5 Drawing Sheets

SERIAL/PARALLEL TRANSFER APPARATUS

This application is a continuation of application Ser. No. 07/113,862, filed on Oct. 29, 1987, now abandoned.

FIELD OF THE INVENTION AND RELATED ART STATEMENT

The present invention relates to an electronic apparatus to which a printer is connected via a printer interface, and in particular, to an electronic device of a structure to which both of a parallel transfer printer and a serial transfer printer can be connected.

From a point of view of the difference in the data transfer methods, the printers can be primarily classified into two kinds, namely, parallel and serial transfer printers. In a parallel transfer printer, print data is processed in a parallel fashion; whereas, in a serial printer, print data is processed in a serial fashion. Consequently, an electronic apparatus, for example, a microcomputer or an electronic weighing apparatus transferring operation control signals and print data to such a parallel or serial transfer printer must be provided with the hardware and programs of the parallel transfer specification or the serial transfer specification, respectively.

FIGS. 4-5 shows a conventional example of a case including an electronic weighing machine as the electronic apparatus. When a parallel transfer printer is to be used, the printer is connected, as shown in FIG. 4, to a body 1 of an electronic weighing apparatus having a hardware and a program each dedicated to the parallel transfer. On the other hand, when a serial transfer printer is to be used, the printer is connected, as shown in FIG. 5, to a body 11 of an electronic weighing apparatus having a hardware and a program each dedicated to the serial transfer.

That is, as shown in FIG. 4, the electronic weighing apparatus body 1 for the parallel transfer includes a 1-chip CPU 2 therein. The 1-chip CPU 2 is provided with a program memory 50 for the parallel transfer. In addition, such a 1-chip CPU 2 is connected to such components necessary for an electronic weighing apparatus as a key 3, a display section 4, and a load cell 5. The 1-chip CPU 2 is connected to a connector 6 on the body side via a data input line, a data output line, etc. The connector 6 on the body side is configured to be dedicated to the printer interface 7 for the parallel transfer. The printer interface 7 is provided with a connector 8 connected to the connector 6 on the body side, a parallel/parallel interface 9 connected to the connector 8, and a conector 10 connected to the parallel transfer printer.

On the other hand, in FIG. 5 showing the configuration of the electronic weighing apparatus 11 for the serial transfer, there is included a 1-chip CPU 12. The difference from the configuration of the electronic weighing apparatus body 1 for the parallel transfer resides in that the 1-chip CPU 12 is provided with a program 51 for the serial transfer and that, in addition, a connector 16 on the body connected by use of a data bus, a control line, etc. is connected to the 1-chip CPU 12 so as to be dedicated to a serial transfer printer interface 17. Consequently, the printer interface 17 corresponding to the electronic weighing apparatus body 11 is also provided with a connector 18 connected to the connector 16 on the body side, a parallel/serial interface 19 connected to the connector 18 for a parallel/serial conversion, and a connector 10 to be connected to the parallel transfer printer (not shown), which is different from the structure of the printer interface 7 described above. Incidentally, the 1-chip CPU 12 is also naturally connected to such components necessary for an electronic weighing apparatus as a key 13, a display section 14, and a load cell 15.

The problems of the prior art technology will be next described. The hardware of the body of the electronic weighing apparatus is structured either for a parallel transfer as shown in FIG. 4 or for a serial transfer as shown in FIG. 5. Consequently, there exists a disadvantage that the electronic weighing apparatus body 1 or 11 can be connected only to a printer of the corresponding transfer system. Namely, when a printer having the different transfer system is to be connected, replacement of the printer interface 7 or 17 is not sufficient, that is, the program memory 50 or 51, the connector 6 or 16, and the like on the electronic weighing apparatus body side 1 or 11 must be respectively modified, which is inconvenient to cope with the different transfer system.

OBJECT AND SUMMARY OF THE INVENTION

It is therefore an object of the present invention to provide an electronic apparatus capable of connecting a parallel transfer printer and a serial transfer printer and of controlling operations thereof.

In order to achieve the object, there are disposed a program memory containing a parallel transfer program and a serial transfer program, a connector on the body sided to which a connector of a printer interface of either a parallel transfer or a serial transfer is connected, and judge means for judging which one of the parallel and serial printer interfaces is connected to the connector on the body side, thereby calling from the program memory a program suitable for a type of the printer interface judged by the judge means. As a result, when a parallel transfer interface is connected to the connector on the body side for a connection of a parallel transfer printer, the condition is judged by the judge means and hence the parallel transfer program is called from the program memory. On the other hand, when a serial transfer interface is connected to the connector on the body side for a connection of a serial transfer printer, the condition is judged by the judge means and hence the serial transfer program is called from the program memory. Consequently, the apparatus can be adapted for the parallel transfer printer as well as for the serial transfer printer.

BRIEF DESCRIPTION OF THE DRAWINGS

The present invention will be apparent from the following detailed description taken in conjunction with the accompanying drawings in which.

DESCRIPTION OF THE PREFERRED EMBODIMENTS

Figure 1A:
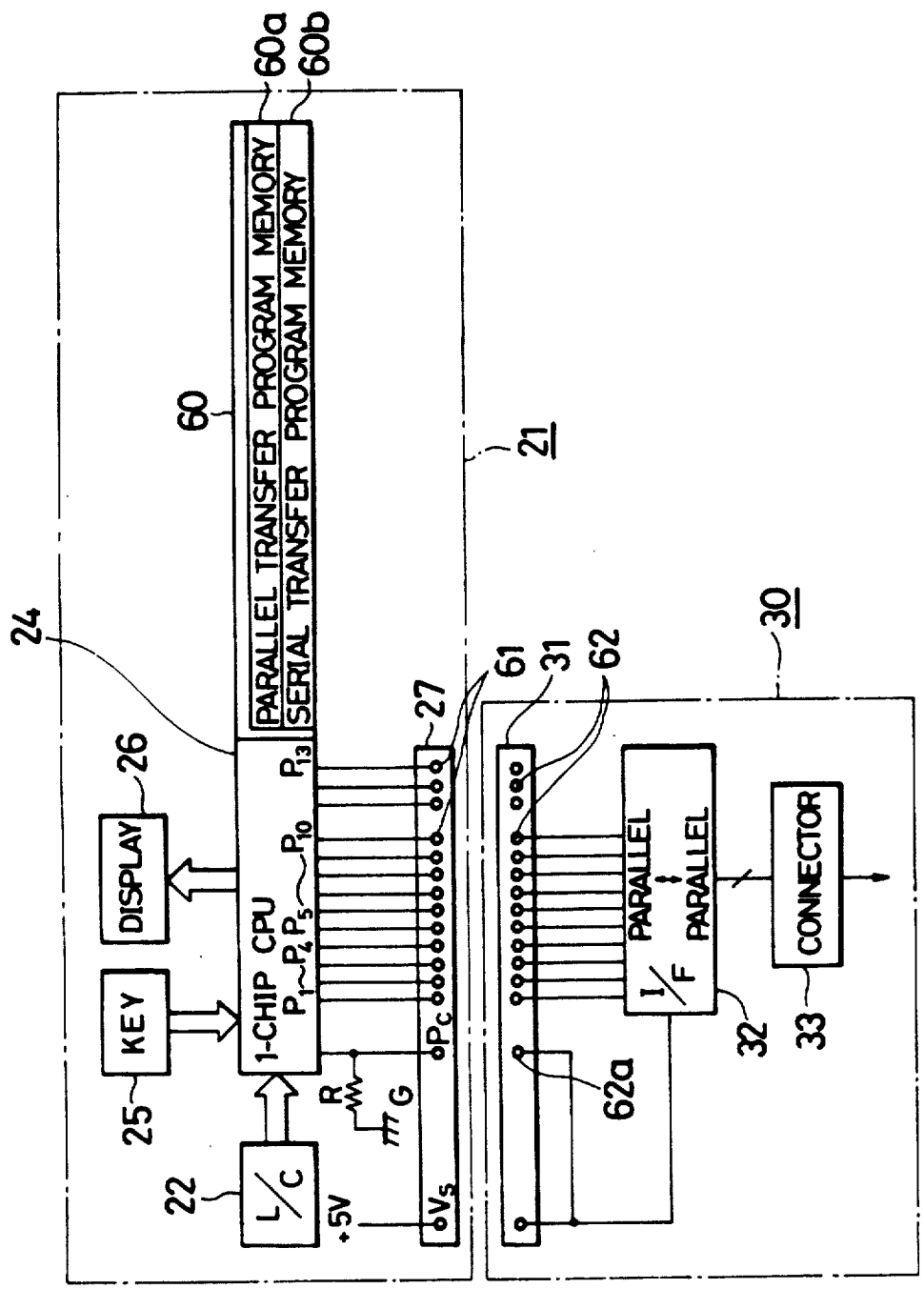
FIGS. 1(a)-(b) show a schematic circuit diagram illustrating an embodiment of the present invention for the parallel and serial transfer operations.
Figure 2:
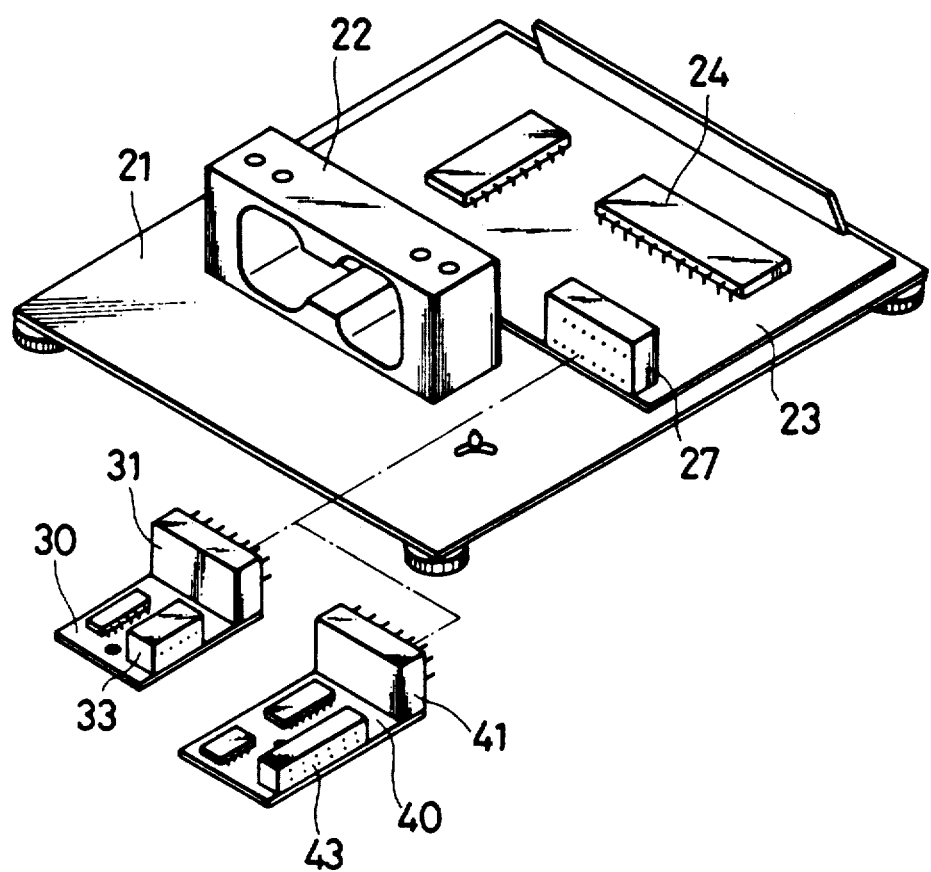
FIG. 2 is an external perspective view of the apparatus of FIGS. 1(a)-(b)
Figure 3:
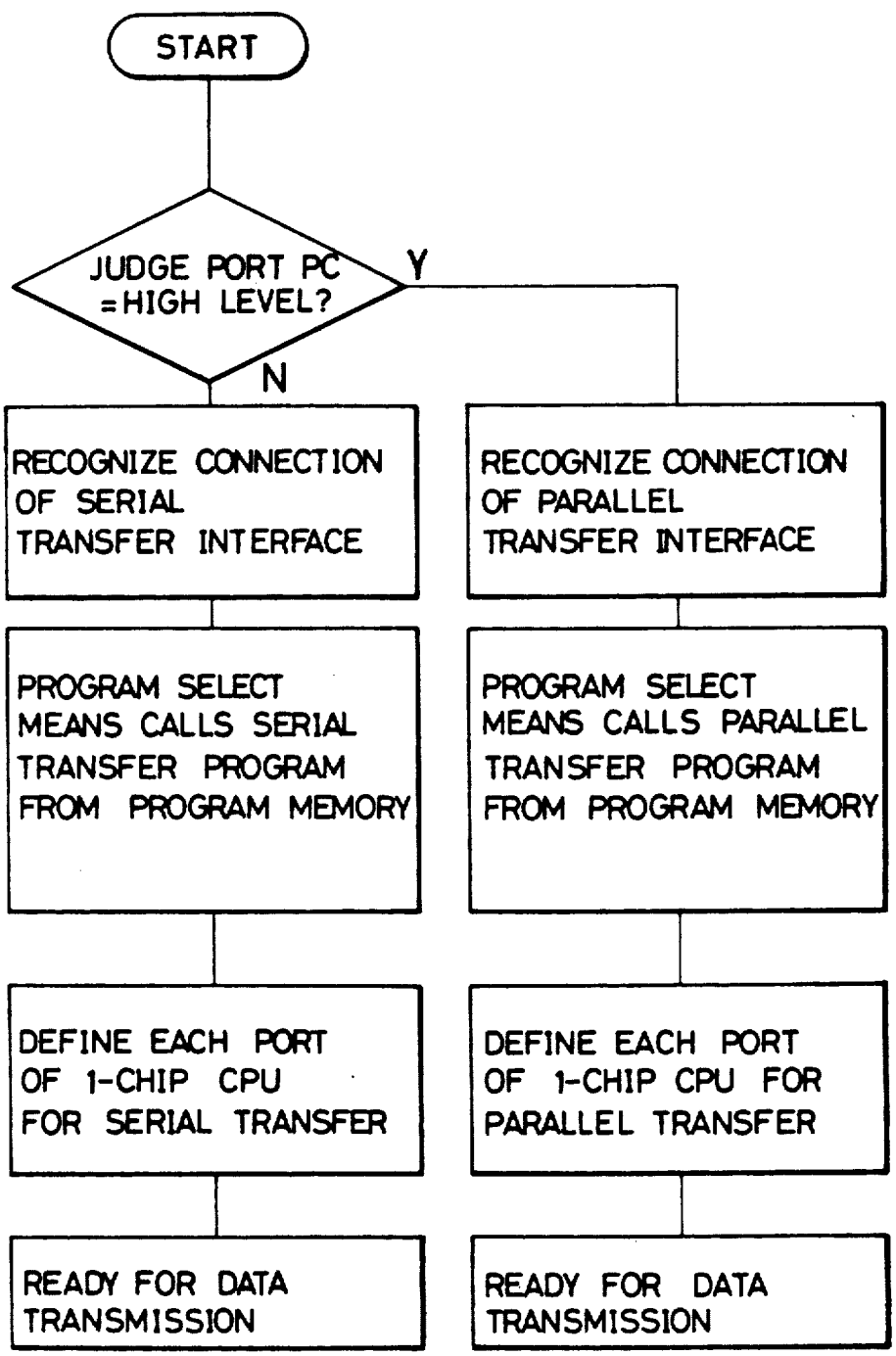
FIG. 3 is a flowchrt showing the operation flow in the circuit of FIGS. 1(a)-(b)
Figure 5:
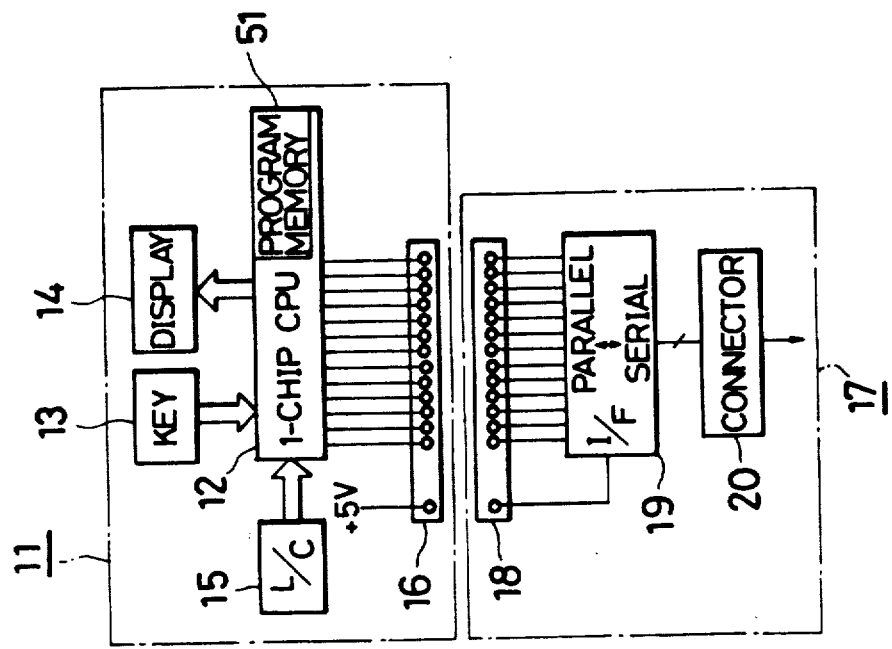
FIG. 5 is a schematic circuit diagram showing a prior art example of the serial transfer specification.
Figure 4:
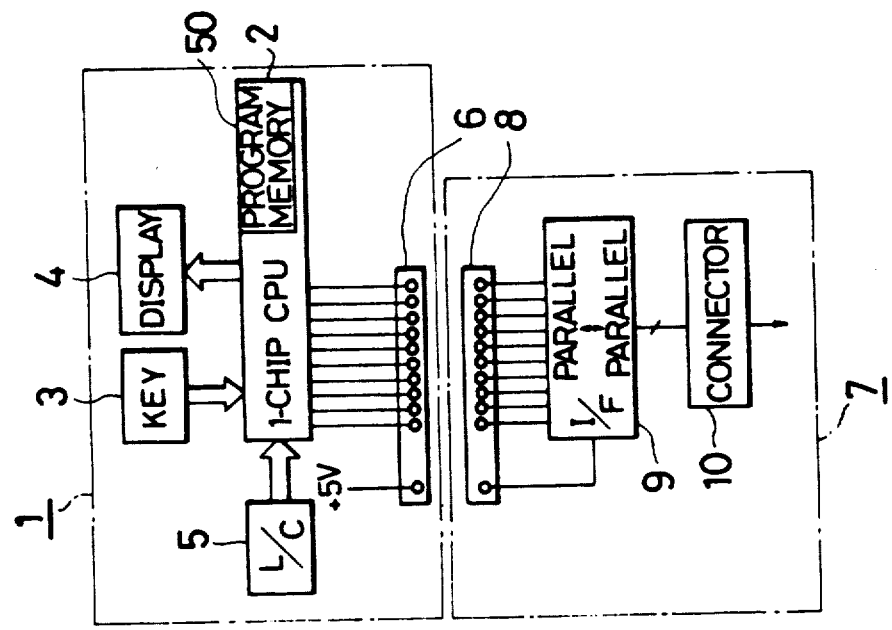
FIG. 4 is a schematic circuit diagram depicting a prior art example of the parallel transfer specification.

An embodiment of the present invention will be described with reference to FIGS. 1-3. In this embodiment, an electronic weighing apparatus is implemented as the electronic apparatus. First, an electronic weighing apparatus body 21 is provided with a load cell 22 and a circuit board 23. On the circuit board 23, there is mounted a 1-chip CPU 24. Here, the 1-chip CPU 24 is different from the conventional 1-chip CPU, that is, both of the parallel transfer program and the serial transfer program are included. More concretely, the 1-chip CPU 24 includes a program memory 60 comprising a parallel transfer program memory 60a and a serial transfer program memory 60b. The parallel transfer program memory 60a is a memory in which a program for a data transfer to a parallel transfer printer is stored. On the other hand, the serial transfer program memory 60a is a memory in which a program for a data transfer to a serial transfer printer is stored. In addition, the program memory 60 also stores a program judging a state of a connector judge port Pc associated with the connector 27 on the body side (to be described later) and program select means including a program to selectively calling into a work area the parallel transfer program memory 60a or the serial transfer program memory 60b. Furthermore, the 1-chip CPU 24 is connected to a key 25, a display section 26, and the load cell 22. Moreover, the 1-chip CPU 24 is connected to the connector 27 on the body side. The connector 27 on the body side is provided with a data transfer port 61 linked with lines drawn from the respective ports $P_1-P_{13}$ of the 1-chip CPU 24, a judge port Pc connected to a port other than the ports $P_1-P_{13}$ of the 1-chip CPU 24, and a voltage supply terminal Vs connected to +5V. An intermediate point of a line connecting the judge port Pc to the 1-chip CPU 24 is connected via a resistor R to the groung G. Incidentally, the judge port Pc, the voltage supply terminal Vs, and the judge port state judge program in the program memory 60 constitute the judge means.

For the side of the such an electronic weighing apparatus body 21, there are provided a printer interface 30 for the parallel transfer and a printer interface 40 for the serial transfer so as to be selectively connected to the electronic weighing apparatus body 21. First, the printer interface 30 includes a connector 31 having a connection pin 62 adaptive to the connector 27 on the body side, a parallel/parallel interface 32 connected to the connector 31 for the parallel processing, and a connector 33 to be connected to a parallel transfer printer (not shown). When the connection pin 62a of the connector 31 for the judge port Pc of the connector 31 is connected to the connector 27 on the body side, the voltage supply terminal Vs of the connector 27 on the body side is connected by a short circuit to the judge port Pc, thereby applying +5V also to the judge port Pc. Furthermore, the connector 31 connects only the components of the data transfer port 61 corresponding to the ports $P_1-P_{10}$ of the 1-chip CPU 24 to the interface 32.

On the other side, the printer interface 40 includes a connector 41 having a connection pin 63 adaptive to the connector 27 on the body side, a parallel/serial interface 42 connected to the connector 41 for effecting a parallel/serial conversion processing, and a connector 43 to be connected to a parallel transfer printer. When the connection pin 63a of the connector 41 for the judge port Pc is connected to the connector 27 on the body side, the judge port Pc of the connector 27 on the body side is set to 0 V state (grounded state). Furthermore, the connector 41 connects only the components of the data transfer port 61 corresponding to all the ports $P_1-P_{13}$ of the connector 27 on the body side to the interface 42.

In the configuration above, since the 1-chip CPU 24 in the electronic weighing apparatus body 21 possesses both of the parallel transfer program and serial transfer program, a parallel transfer printer and a serial transfer printer can be fundamentally connected thereto. FIG. 1(a) shows a case where the connector 31 of the printer interface 30 is inserted into the connector 27 on the body side to establish the connection, thereby setting a state in which a parallel transfer printer can be connected. On the other hand, FIG. 1(b) shows a case where the connector 41 of the printer interface 40 is inserted into the connector 27 on the body side to establish the connection, thereby setting a state in which a parallel transfer printer can be connected.

In such two configurations, the state of the judge port Pc is used to judge which one of the connectors 31 and 41 is connected to the connector 27 on the body side. The operation flow ranging from the judgment to the data transmission will be described with reference to the flowchart of FIG. 3. First, in a case where the connector 31 is connected as shown in FIG. 1(a), +5V is also applied to the judge port Pc of the connector 27 on the body side. In this case, the 1-chip CPU 24 recognizes that the parallel transfer interface 30 has been connected to the connector 27 on the body side. This causes the program select means in the program memory 60 to call the parallel transfer program memory 60a into the work area. As a result, the ports $P_1-P_{13}$ are defined for the parallel transfer use. That is, the ports $P_1-P_4$ are set to the data input use, the ports $P_5-P_{10}$ are set to the data output use, and the ports $P_{11}-P_{13}$ are set to the floating state. This completes the preparation of the data transfer and enables the system in the constitution of FIG. 1(b) to be connected to a parallel transfer printer.

Figure 1B:
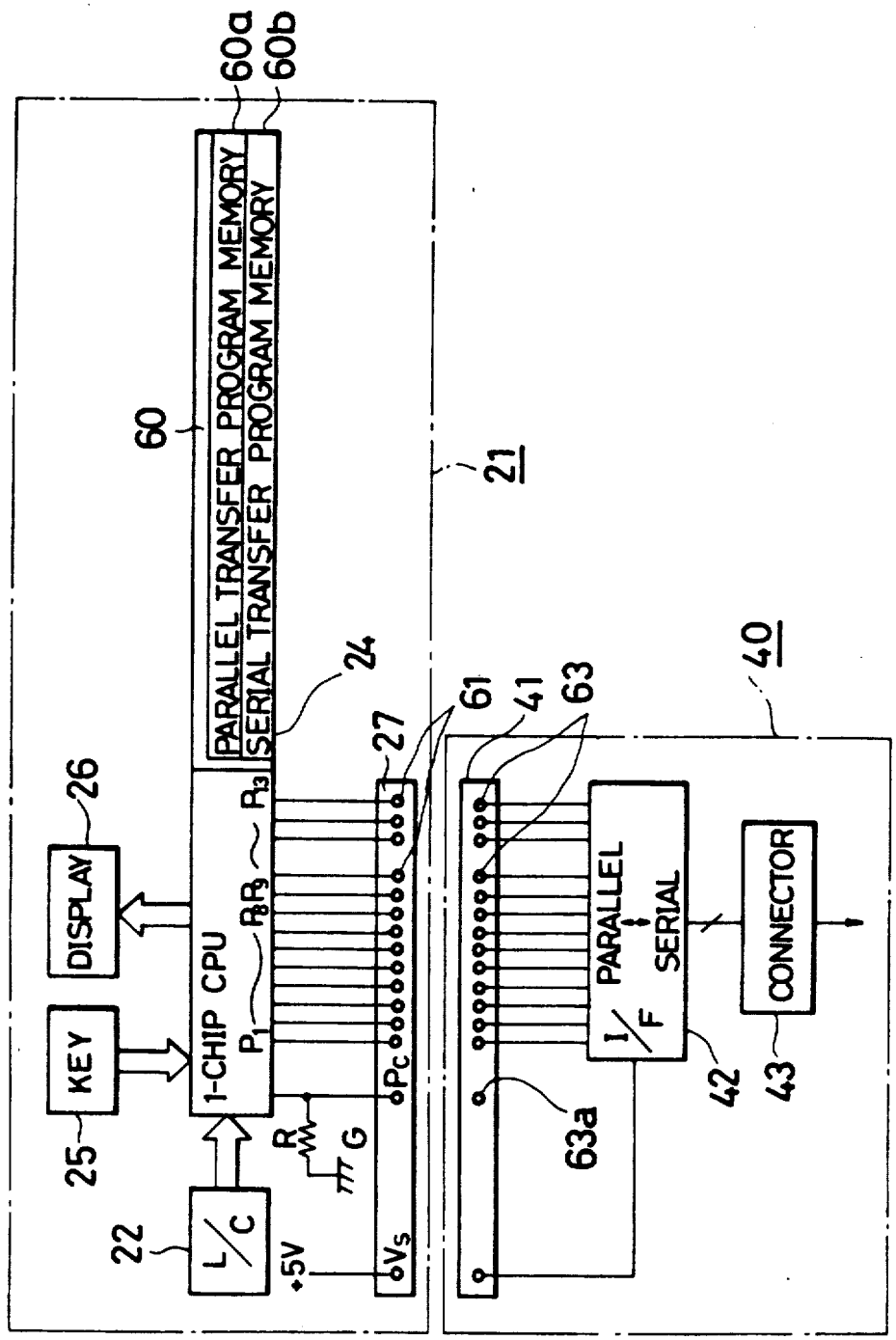

On the other hand, in a state of FIG. 1(b) where the connector 27 on the body side is connected to the printer interface 40 in place of the printer interface 30, the judge port Pc of the connector 27 on the body side is not supplied with +5V and is in the grounded state of 0 V. That is, the judge port Pc is at a low level. In this situation, the 1-chip CPU 24 recognizes that the serial transfer interface 40 has been connected to the connector 27 on the body side. The program select means in the program memory 60 then calls the serial transfer program memory 60b into the work area. As a result, the ports $P_1-P_{13}$ of the 1-chip CPU 24 are defined for the serial transfer use. That is, the ports $P_1-P_8$ are set to the data input use, the ports $P_9-P_{13}$ are set as control lines. This enables the system in the constitution of FIG. 1(b) to be connected to a serial transfer printer.

As described above, according to the present invention, without changing or modifying the hardware on the side of the electronic weighing apparatus body 21, the system can be used with a parallel transfer printer and a serial transfer printer only through a connection of the printer interfaces 30 and 40. That is, a printer of an arbitrary transfer type can be used without necessitating the modification of the hardware on the side of the electronic weighing apparatus body 21, thereby implementing an economical system.

The present invention can also be applied to a microcomputer and the like in addition to the electronic weighing apparatus of the embodiment.

While the present invention has been described with reference to the particular illustrative embodiments, it is not restricted by those embodiments but only by the appended claims. It is to be appreciated that those skilled in the art can change and modify the embodiments without departing from the scope and spirit of the invention.

What is claimed is:

1. An electronic apparatus having a body comprising:
   a program memory for storing a program for the parallel transfer of data and a program for the serial transfer of data to a peripheral device;
   a connector means which is part of the electronic apparatus and which is mounted on said electronic apparatus, to which a printer interface connector for parallel transfer or serial transfer is detachably connected;
   judging means, contained within said connector means for judging whether the printer interface connected to said connector is for the parallel transfer or for the serial transfer of data, having a judge port being supplied with voltages of different values in case where the connector is connected to a parallel transfer interface and when the connector is connected to a serial transfer interface respectively; and
   program selected means for calling, from the program memory, a program adapted for the kind of printer interface, judged by said judge means which is connected to said electronic apparatus, in accordance with the type of output needed.

2. An electronic apparatus according to claim 1 further including:
   a weighing section;
   a display section; and
   a key.

3. An electronic apparatus according to claim 1 wherein said weighing section is a load cell weighing unit.

4. An electronic apparatus according to claim 1 wherein said program memory is integrally disposed in a 1-chip CPU.

5. An electronic apparatus according to claim 1 further including a voltage supply terminal supplying a voltage to the connector means wherein when the connector means is connected to either the parallel transfer interface or the serial transfer interface, said voltage supply terminal is connected to said judge port through a short circuit.

6. An electronic apparatus having a body comprising:
   a program memory for storing a parallel transfer program and a serial transfer program;
   a plurality of data transfer ports for transferring data forming connector means mounted on one of the sides of the body of said electronic apparatus to which a printer interface connector for parallel transfer or serial transfer of data is detachably connected;
   a voltage supply terminal to which voltage is supplied;
   a judge port means for judging whether the printer interface connected to the connector for the parallel transfer or for the serial transfer of data and which is connected to said voltage supply terminal through a short circuit when either a parallel transfer interface or a serial transfer interface is connected to one of the connectors located on said electronic apparatus; and
   program select means for calling from the program memory a program adapted for the kind of printer interface need, as judged by said judging means.

* * * * *